O. JAEGER.
COIN CONTROLLED VENDING DEVICE.
APPLICATION FILED NOV. 1, 1912. RENEWED SEPT. 24, 1915.
1,181,530.
Patented May 2, 1916.
5 SHEETS—SHEET 3.
FIG. III.
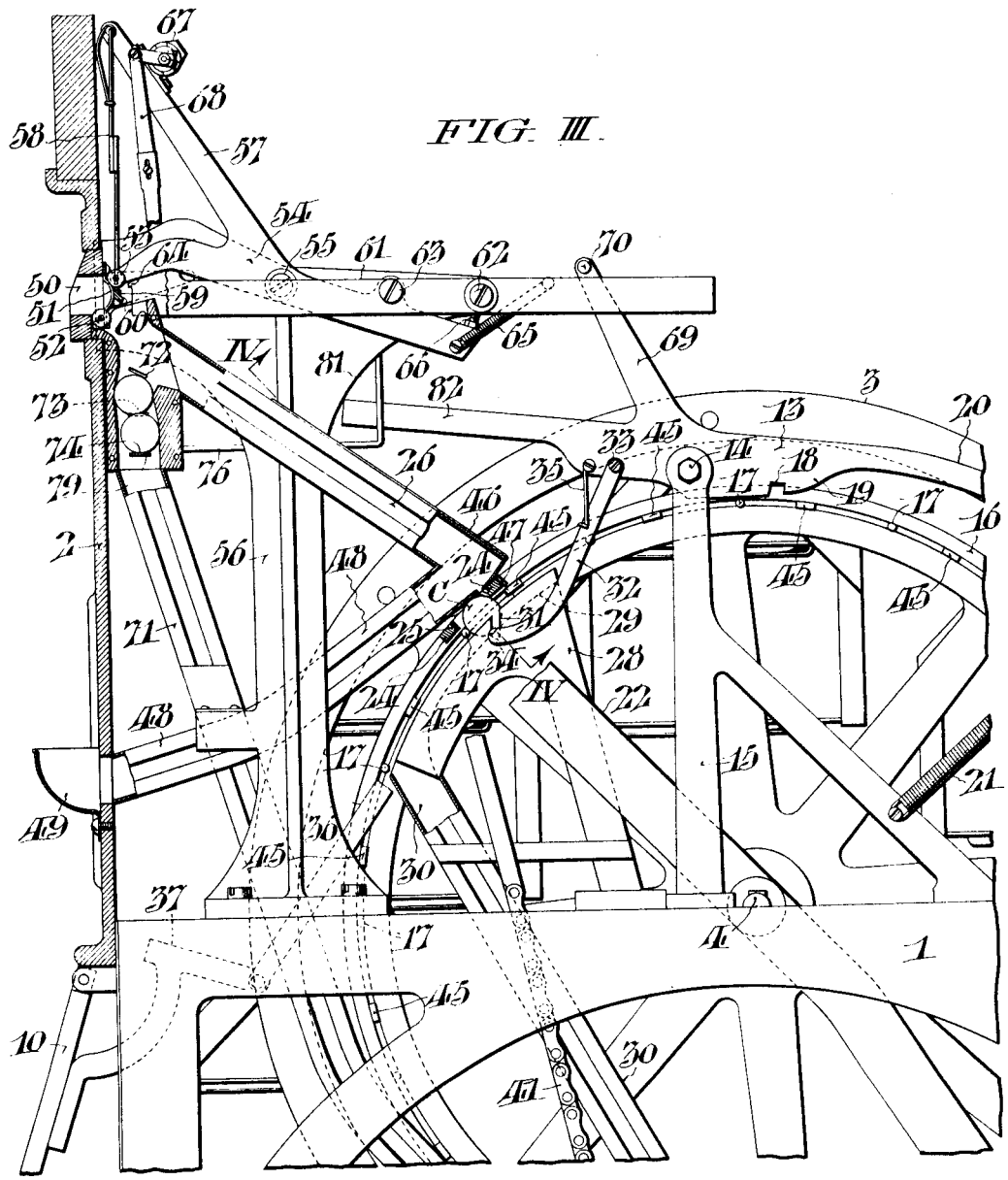
Witnesses
John C. Bergner
James H. Bell
Inventor
Otto Jaeger
by Fuley & Paul
Attorneys O. JAEGER.
COIN CONTROLLED VENDING DEVICE.
APPLICATION FILED NOV. 1, 1912. RENEWED SEPT. 24, 1915.
1,181,530.
Patented May 2, 1916.
5 SHEETS—SHEET 4.
FIG. IV.
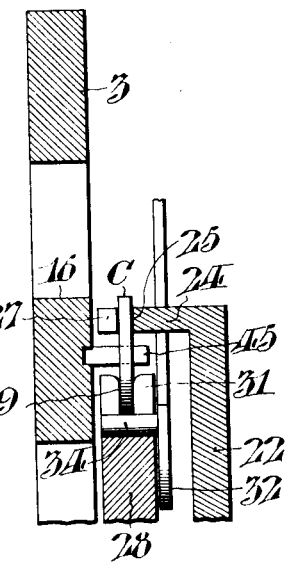
FIG. VIII.
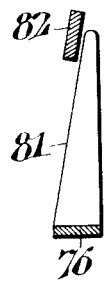
FIG. IX.
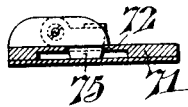
FIG. V.
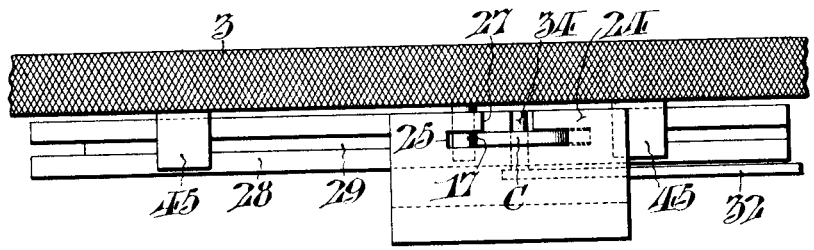
FIG. VI.
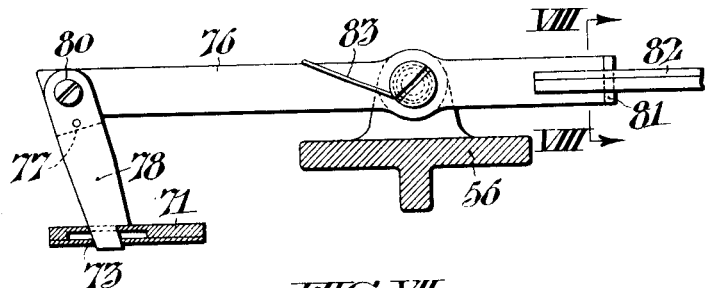
FIG. VII.
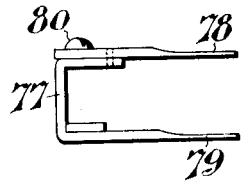
Witnesses
John C. Bergner
James H. Bell
Inventor
Otto Jaeger;
by Tuley & Paul
Attorneys O. JAEGER.
COIN CONTROLLED VENDING DEVICE.
APPLICATION FILED NOV. 1, 1912. RENEWED SEPT. 24, 1915.
1,181,530.
Patented May 2, 1916.
5 SHEETS—SHEET 5.
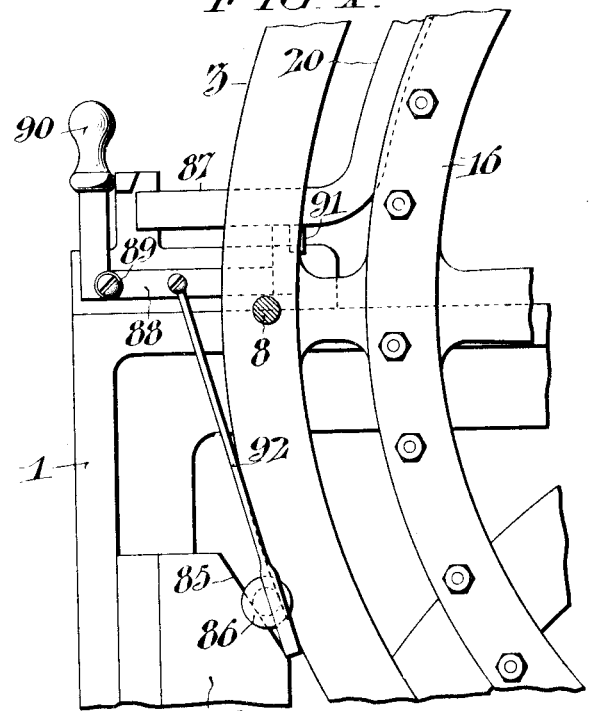
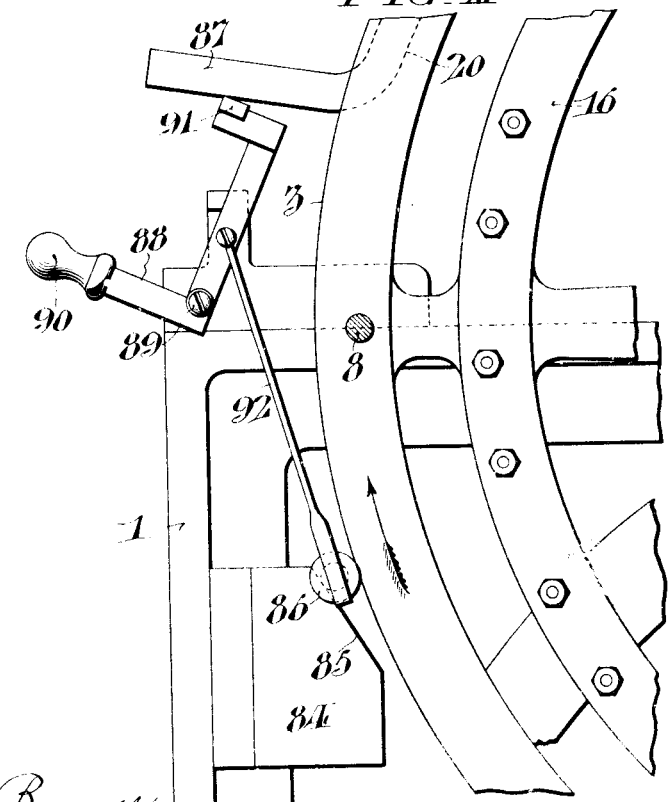

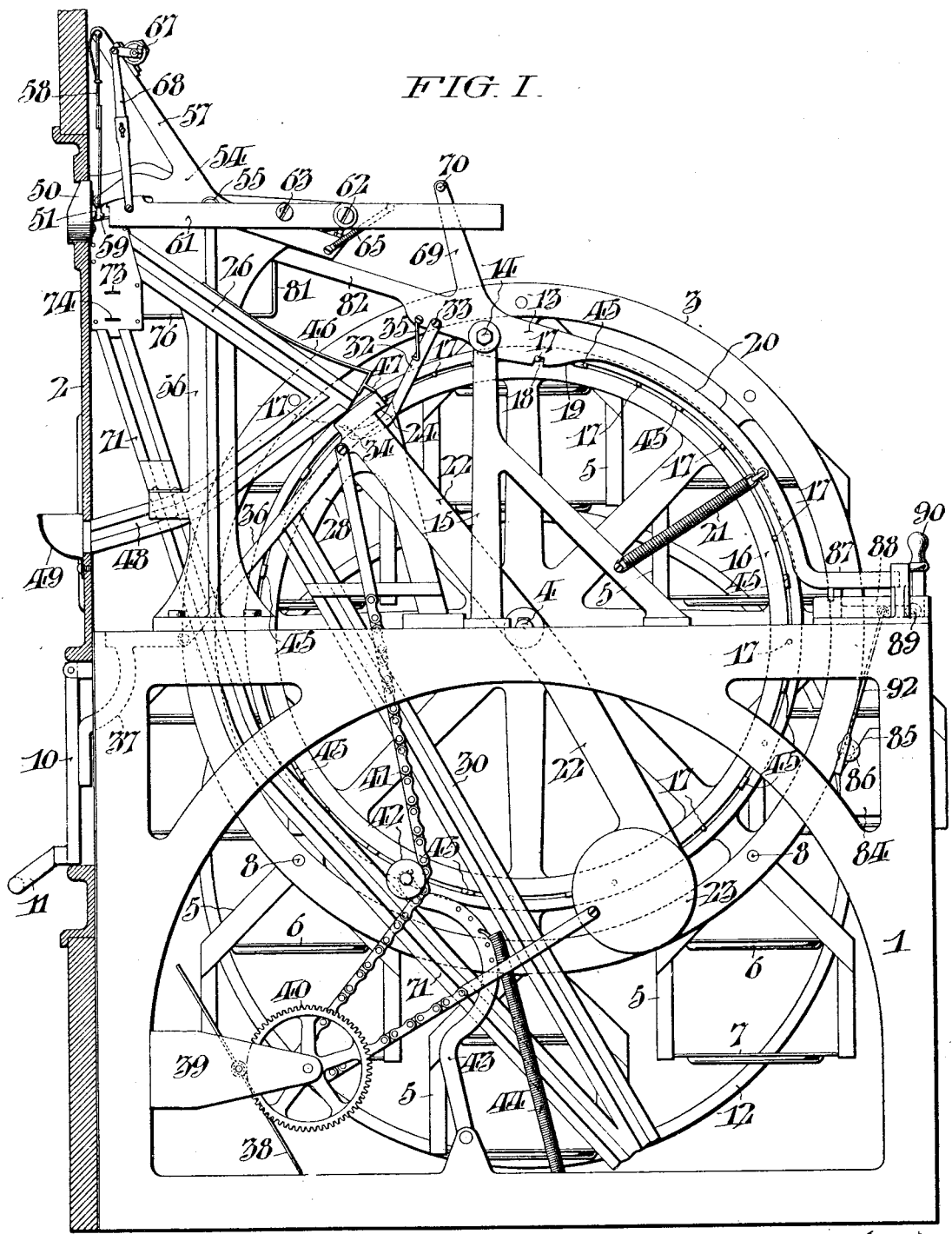

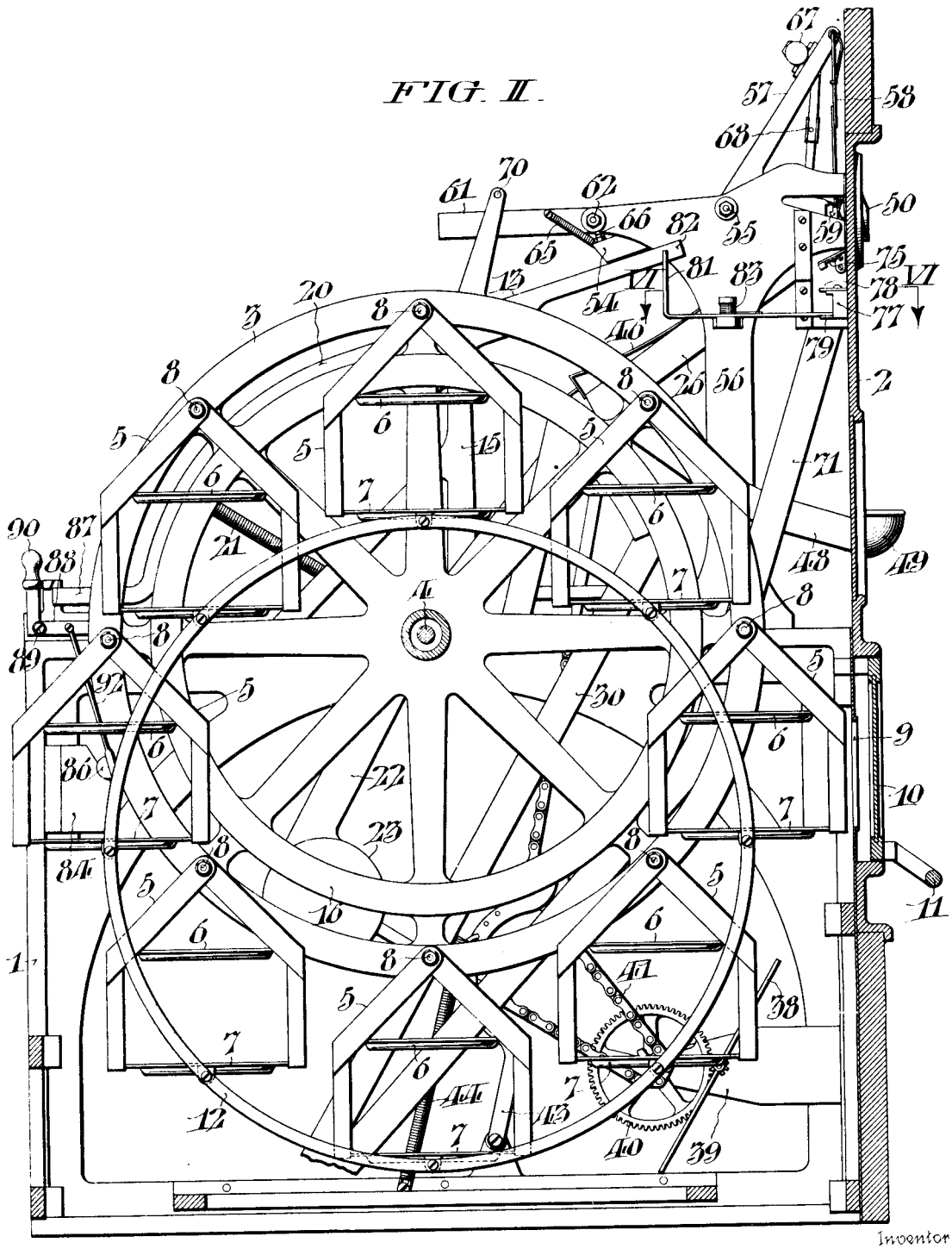

UNITED STATES PATENT OFFICE.

OTTO JAEGER, OF NORRISTOWN, PENNSYLVANIA, ASSIGNOR TO AUTOMATIC MACHINE VENDING COMPANY, OF PHILADELPHIA, PENNSYLVANIA, A CORPORATION OF NEW JERSEY.

COIN-CONTROLLED VENDING DEVICE.

1,181,530.  Specification of Letters Patent.  Patented May 2, 1916.

Application filed November 1, 1912, Serial No. 728,991. Renewed September 24, 1915. Serial No. 52,534.

*To all whom it may concern:*

Be it known that I, OTTO JAEGER, of Norristown, in the county of Montgomery and State of Pennsylvania, have invented certain new and useful Improvements in Coin-Controlled Vending Devices, whereof the following is a specification, reference being had to the accompanying drawings.

The invention relates to coin-controlled vending devices, and more particularly to devices of this character, wherein the coin locks a manually-operable member to the vending device.

An object of the invention is to provide a vending device of the above character, wherein the coin releases a carrier on which the articles to be vended are placed, and also serves to lock a manually operable member to said carrier, whereby said carrier may be moved to position the articles for delivery.

A further object of the invention is to provide a coin-controlled mechanism or vending device of the above character in which the coin is released from the operating member and the carrier.

A further object of the invention is to provide a mechanism which retards the rearward movement of the operable member after the same is released from the carrier.

A further object of the invention is to provide a coin-controlled mechanism wherein a plurality of coins are required to effect the releasing and operation of the device.

These and other objects will in part be obvious, and will in part be hereinafter more fully disclosed.

In the drawings which show by way of illustration one embodiment of the invention, Figure I, is a vertical section through the casing, showing my improved coin-controlled vending device in side elevation. Fig. II, is a vertical sectional view looking from the opposite side of said vending device. Fig. III, is an enlarged view partly in vertical section through the coin-receiving slot and the coin chute leading therefrom; also through the operating member for the carrier and showing the coin support and the trip for the carrier in side elevation; in this figure the rotating carrier has been slightly moved, after the coin has been inserted into the machine. Fig. IV, is an enlarged detail section taken on the line IV, IV, of Fig. III, through the carrier, the coin support and the upper end of the operating member. Fig. V, is a partial plan view of the parts shown in Fig. IV. Fig. VI, is an enlarged sectional view taken on the line VI, VI, of Fig. III, showing the releasing means for the additional coins when said device is adjusted, so as to require a plurality of coins for releasing the vending device. Fig. VII, is a side view of the supporting fingers for the coins. Fig. VIII, is a sectional view on the line VIII, VIII, of Fig. VI. Fig. IX, is a detail in section through the coin chute, showing a stop in plan view for cutting off the auxiliary coin chute. Fig. X, is a detail showing in side elevation the manual means for releasing the carrier. Fig. XI, is a similar view showing said manual means turned so as to release the carrier.

In carrying out the invention, I have provided a vending device which comprises a main frame 1, having a front panel 2. Mounted in the main frame 1, is a rotating carrier 3. This rotating carrier is supported by a central shaft 4, journaled in the frame, so that the carrier is free to rotate on said shaft. Said carrier consists, as herein shown, of an annular rim carried by radial arms extending from the central hub. Upon this outer rim are pivoted a series of supporting trays 5. Each of these trays includes as herein shown, upper and lower supporting members 6, and 7. The trays 5, are pivoted at 8, above the supporting members, so that each tray swings beneath its pivotal support. These trays are suitably spaced about the rotating carrier, so that as the carrier rotates they may be brought one at a time in front of an opening 9, in the front panel of the casing, which opening may be closed by a swinging door 10, having a handle 11, secured thereto.

In order to keep the trays in upright position as the carrier rotates, I have pivotally secured to each tray, centrally of the bottom supporting member, a ring 12. This ring floats, so to speak, on the pivotal connections with the trays and prevents the trays from tilting as the carrier rotates.

The carrier is held from rotation by a locking lever 13, which is pivoted at 14, to a bracket 15, carried by the main frame 1. Mounted on the radial members of the carrier at one side thereof, is a ring 16, which is provided with suitably spaced pins 17, adapted to engage a notch 18, in the locking lever 13. This locking lever 13, is also provided with a cam face 19, leading to the notch, so that said cam face will ride on the pin 17, and allow said pin to drop into the notch. Said locking lever 13, is formed with an extension 20, which terminates at a point in the rear of the carrier, where said extension may be engaged by a manually-controlled means, when it is desired to release the carrier for turning the same to load the trays. A spring 21, is secured at one end to the extension of the lever 13, and at its other end to the bracket 15. This spring normally holds the lever 13, in contact with the pin 17.

The locking lever is released from the pin 17, by a coin and a manually-operable member 22. This manually-operable member is pivoted to swing about the shaft 4, as an axis, and is provided with a weighted lower end 23. The upper end of the member 22, is bent laterally as at 24, see Figs. IV, and V. Said inner end is formed with a slot 25, adapted to receive a coin passing along the coin chute 26. Said bent end 24, is also provided with a slot 27, which leads transversely to the slot 25. The upper end of the member 22, extends over a coin-supporting ledge or guide 28, which is formed with a groove 29. This guide 28, is mounted on the main frame 1, and is, therefore, fixed relative to the movement of the carrier. Said guide at its outer face is curved concentrically with the axis of movement of the carrier. The groove in the outer face of the supporting guide for the coin is shaped so as to discharge the coin into a coin receiving chute 30. Said guide is formed with a transverse inclined slot 31. A link 32, is pivoted at 33, to the locking lever 13. Said link at its lower end is provided with a pin 34, which extends into said transverse slot and across the groove 29, in the guide 28. A spring 35, carried by the lever 13, presses against the link 32, and normally forces the pin 34, against the inclined wall of the slot 31.

When the parts are positioned as shown in Fig. I, a coin will be passed down the chute 26, and will drop out of the lower end thereof, into the slot 25, in the upper end of the operating member 22, and will rest in the groove 29, of the guide 28, as indicated at C, in Fig. III. The coin at this time is slightly in rear of the pin 17, on the carrier. The pin 34, of the link 32, is at the upper end of the inclined slot 31. When the operating member 22, is turned about its pivotal support, the coin will be forced along the groove 29, in the guide 28, and will engage the pin 34, and force the same downward in said inclined slot 31, and thus draw down on the lever 13. The point of attachment of the link 32, to the lever 13, is on the opposite side of the fulcrum of the lever from the notch which engages the pin on the carrier, and, therefore, this downward movement of the pin 34, in the inclined slot 31, will raise the locking lever, so as to release the pin on the carrier. A further movement of the operating member 22, brings the coin C, against the pin 17, as seen in Fig. III, and the carrier and operating member will move together until such point is reached in the guide 28, that the coin is allowed to pass underneath the pin 17, and into the receiving chute 30. As soon as the coin has moved away from the pin 34, the link 32, will be released and the spring 21, will swing the locking lever so that said locking lever will engage the next succeeding pin on the carrier. This pin will ride along the cam surface 19, of the lever and move into the notch 18, so that when the carrier is released from the operating member by the dropping of the coin into the receiving chute, the next pin on the carrier will be engaged by the locking lever and the carrier again locked and held until another coin is inserted in the machine. As soon as the operating lever 22, has been released from the coin, it may be returned to its normal position, as shown in Fig. I, ready to receive the next coin for operating the carrier. As a means for swinging the operating member 22, I have provided said member 22, with a link 36. The swinging door 10, for closing the openings 9, carries a rigid bracket 37, which projects inwardly and is attached to the link 36, so that, when said door is manually swung for opening the same, the operating member 22, will be swung about its pivotal support. When the door is released, the weighted end 23, of the operating member 22, will return the same to normal position, as shown in Fig. I.

In order to prevent too rapid movement of the operating member as it is returned, I have provided a retarding mechanism, which consists of a fan wheel 38, pivoted on a bracket 39, carried by the main frame. This fan wheel is provided with a pinion which meshes with a gear wheel 40, also journaled in said bracket 39. A sprocket chain 41, runs over a sprocket wheel on the shaft carrying the gear wheel 40. This sprocket chain is attached at one end to the weighted end 23, of the operating member 22, while the other end of the sprocket chain is attached to said operating member adjacent the coin-receiving slot formed therein. An idle pulley 42, contacts with said sprocket chain. Said idle pulley is carried by a swinging arm 43. A spring 44, is attached to said swinging arm at one end, and at the other end to the main frame, and operates to hold said idle pulley yieldingly in contact with the sprocket chain. This idle pulley serves to take up any slack in the sprocket chain due to the oscillation or movement of the operating member 22, and keeps said sprocket chain in proper running contact with the sprocket wheel connected to the pinion 40.

It will thus be seen that when the door 10, is released, the weighted member 23, will return the operating member 22, and the fan wheel 38, will retard this returning movement, so that the parts will slowly and without jar return to their normal position.

In order to prevent the carrier running away from the operating mechanism, if the same should be overloaded, I have provided a stop finger 45. There is a stop finger placed a slight distance in rear of each pin 17, on the carrier. This stop finger, if the parts are positioned as shown in Fig. III, would prevent the carrier from running forward by reason of being overloaded on the forward side, as said finger would strike the coin which would hold the carrier from movement except as the coin moves along the slot in the supporting bar.

At the lower end of the coin chute 26, is a swinging gate 46. This gate is provided with a lug 47, adapted to be engaged by the operating member 22. When the operating member 22, is in normal position, said lug will be engaged thereby and the gate swung so as to uncover the lower end of the coin chute 26, as seen in Fig. I. If, however, said operating member 22, is moved forward for the purpose of operating the carrier, or for any other reason, the gate will swing across the lower end of the chute, as shown in Fig. III, and coins then dropped into the chute 26, will strike the gate and be deflected into the cross chute 48, to a cup 49, at the front panel of the vending device.

The coin is introduced into the coin chute 26, through a coin-receiving slot 50. This coin slot is provided with a slotted guard 51. A roller 52, is journaled so as to extend across the slot at the lower end thereof. A second roller 53, extends across the upper end of the slot, and is carried by a pivoted lever 54. This lever is pivoted at 55, to a bracket 56, carried by the main frame. The lever 54, is provided with an upwardly projecting arm 57, from which swings an arm 58, carrying a bar 59, which normally extends across the coin slot in the guard 51. This bar 59, is provided with a lip 60, which projects inwardly therefrom. A lever 61, is pivoted at 62, to the bracket 56. This lever is also pivoted at 63, to the lever 54. At the forward end of the lever 61, is formed an overhanging lip 64, which is adapted to coöperate with the lip 60, on the bar 59. The end of the lever 61, is directly in rear of the bar 59. The lever 61, is connected to the lever 54, by a spring 65. This spring normally operates to draw the ends of said levers toward each other. A stop 66, limits this movement.

When the parts are positioned as shown in Fig. III, if a proper size coin is inserted in the slot 60, the roller 53, will be engaged and raised. This upward movement of the inner end of the lever 54, through the pivotal connection 63, with the lever 61, will swing the inner end of said lever 61, downwardly, and will allow the bar 59, to move over the top of the lever. This permits the coin to pass through the slot in the guard into the coin chute 26. As soon as the coin passes the roller 53, the spring 65, will return the parts to the normal position shown in Fig. III.

If an improper size coin is inserted in the coin slot, the same will strike the bar 59, and move the same against the end of the lever 61, and this will prevent the coin from passing into the slot. It will, therefore, be seen that only coins of a proper diameter may be inserted in the slot.

Mounted on the arm 57, of the lever 54, is a counter 67. The arm of the counter is connected to a link 68, which in turn is pivoted to the inner end of the lever 61. As the inner end of the lever 61, moves downwardly and the arm 57, moves upwardly, the counter 67, will be operated to register the number of coins passed through the coin slot.

The locking lever 13, is formed with an arm 69, which carries a pin 70, projecting over the end of the lever 61. If for any reason the locking lever 13, is raised by the manually-controlled devices at the rear of the machine, said pin 70, will move to a point which will prevent the lever 60, from swinging, and thus prevent the insertion of coins while the carrier is released.

My invention also contemplates the construction of a coin chute and controlling devices whereby a plurality of coins, if desired, may be inserted before the carrier is released and operated. To this end, I have provided an auxiliary coin chute 71. This auxiliary coin chute 71, joins the coin chute 26, adjacent its receiving end. Said auxiliary coin chute also at its lower end joins the receiving coin chute which discharges the coins into a receiving drawer (not shown).

The auxiliary coin chute is formed with three slots 72, 73, and 74. A stop 75, see Fig. IX, is pivoted to a lug on the side of the coin chute, and is adapted to be moved so as to extend through the slot 72, and across the coin chute. When this stop is positioned as shown in said figure a coin passing through the coin-receiving slot 50, will engage the stop and roll down the main chute 26. When, however, said stop is withdrawn, the first coin passing through the coin slot 50, will drop into the auxiliary coin-receiving chute 71. A lever 76, is pivoted on a lug carried by the bracket 56, and said lever is provided with a yoke 77, carrying fingers 78, and 79. The finger 78, is adapted to enter the slot 73, and the finger 79, is adapted to enter the slot 74. When this lever 76, is moved in one direction, said fingers 78, and 79, will be moved through the slots across the passage in the coin chute 71. When the lever is moved in the opposite direction, said fingers will be withdrawn from the chute. The finger 78 is removably attached to the yoke by a screw 80. The other end of the lever 76, is provided with an upwardly turned part having a cam face 81. The lever 13, is extended as at 82, see Fig. III, and this extended end of the lever is adapted to coöperate with the cam face 81, of the lever 76. When said lever 13, is moved so as to release the carrier, the extension 82, will engage the cam face 81, and will retract the fingers 78, and 79, from the coin slot, so as to release any coins supported thereby. When the lever 13, again moves to engage and hold the carrier, a spring 83, will swing the lever 76, so as to move the fingers 78, and 79, across the passage in the coin slot. When the finger 78, is attached to the yoke, then the first coin passing through the coin slot 50, will lodge on said finger, and the second coin will pass down the main coin chute. If, however, this finger 78, is removed, then the first coin passing through the coin slot 50, will be supported by the finger 79, the second coin will be supported by the first coin and the third coin will pass down the main chute to release the carrier.

As soon as the carrier is released, the coins in the auxiliary chute are also released, as above noted. There are times when it is desirable to release the carrier independently of the coin-controlled mechanism for the loading of the same, and this is accomplished by a manually-controlled mechanism at the rear of the frame. Mounted on the frame is a bracket 84, which is formed with an inclined face 85. A roller 86, rests on said inclined face and coöperates with the outer rim of the main carrier. This roller will permit the carrier to move in the direction of the arrow in Fig. XI, but will prevent any movement of the carrier in the opposite direction, as the roller will wedge against said inclined face 85.

The lever 13, as above noted, is provided with a rearward extension 20, which is bent outwardly as at 87. A lever 88, is pivoted at 89, to the main frame, and is provided with an operating handle 90. The inner end of said lever is formed with a cross bar 91, which is adapted to engage the extension 87, of the lever 13, and when said lever 88, is swung from the position shown in Fig. X, to the position shown in Fig. XI, said locking lever for the carrier will be disengaged therefrom. An arm 92, is pivoted to the releasing lever 88, and the lower end of said arm extends underneath the roller 86, so that when said releasing lever is moved to a position to swing the locking lever 13, the roller 86, will be moved to the position shown in Fig. XI, so as to be out of contact with the carrier and permit the carrier to be moved in either direction.

From the above description, it will be apparent that I have provided a vending device wherein a rotating carrier is formed with trays on which the articles to be vended may be placed. This rotating carrier is locked against movement until a proper coin is inserted in a coin-receiving slot. This coin coöperates with a manually-operable member to first release the carrier and to then turn the carrier so as to bring a tray with the articles supported thereon, to the point of delivery. The operable member for swinging and releasing the carrier is connected with a door which closes the opening into the vending device, and, therefore, the insertion of a coin in the slot, and the movement of the door to give access to the opening in the vending device, accomplishes the releasing of the carrier and the positioning of a tray with the article to be vended in front of said opening.

It will be obvious that the opening of the door and the swinging of the operating member will have no effect upon the carrier until the proper coin is inserted in the coin slot and connects said operating member to the releasing and operating devices for the carrier.

It will be obvious that minor changes in the details of construction and arrangement of parts may be made, without departing from the spirit of the invention, as set forth in the appended claims.

Having thus described my invention, I claim:

1. The combination of a rotating carrier, having means for supporting articles to be vended, of a coin-controlled mechanism for releasing and operating the same, including an operating member, a supporting guide having a groove therein to receive a coin, means carried by said operating member and engaging and moving the coin along said groove, means mounted on the carrier and extending into the path of movement of the coin, whereby said carrier is moved by the operating member through the coin, a locking lever, for holding the carrier from movement, a member connected to said lever and projecting across the path of movement of the coin, whereby the first movement of the coin before it engages the carrier releases said lever.

2. The combination of a rotating carrier having means for supporting articles to be vended, of a coin-controlled mechanism for releasing and operating the same, including an operating member, a coin supporting guide, having a groove therein for a coin, a pin mounted on the carrier and extending across said groove, so as to be engaged by the coin, said operating member having the free end thereof bent over said supporting guide and slotted to receive the coin, whereby a movement of the operating member will cause the coin to move along said groove, engage said pin, and rotate the carrier, said groove being shaped so as to permit a coin to be released when the carrier has been moved a predetermined distance.

3. The combination of a rotating carrier, having means for supporting articles to be vended, of a coin-controlled mechanism for releasing and operating the same, including an operating member, a coin supporting guide, having a groove therein for a coin, a pin mounted on the carrier and extending across said groove, so as to be engaged by the coin, said operating member having the free end thereof bent over said supporting bar and slotted to receive the coin, whereby a movement of the operating member will cause the coin to move along said groove, engage said pin, and rotate the carrier, said groove being shaped so as to permit a coin to be released when the carrier has been moved a predetermined distance, a lever for locking the carrier, a member connected with the lever and projecting across the path of the coin, whereby the first movement of the coin will engage said member and release said lever.

4. The combination of a rotating carrier, having means for supporting articles to be vended, of a coin-controlled mechanism for releasing and operating the same, including an operating member for turning said carrier, devices whereby said operating member is locked to the carrier by a coin, and means operated by the coin for releasing the carrier, a door for closing and opening in the front of the casing containing said carrier, and means for connecting said door to said operating member, whereby the opening of the door will swing said operating member.

5. The combination of a rotating carrier, having means for supporting articles to be vended, of a coin-controlled mechanism for releasing and operating the same, including an operating member for turning said carrier, devices whereby said operating member is locked to the carrier by a coin, and means operated by the coin for releasing the carrier, a door for closing and opening in the front of the casing containing said carrier, and means for connecting said door to said operating member, whereby the opening of the door will swing said operating member, and means for automatically closing the door and returning said operating member to normal position.

6. The combination of a movable member for vending articles, an operating member therefor, a coin supporting guide, having a coin supporting groove therein, said operating member having devices for engaging the coin on said guide, whereby the coin may be moved along said guide, a member carried by the movable vending member and extending into the path of the coin, whereby the movement of the coin will move said vending member, and means for holding said vending member from movement, said means having devices whereby the coin will engage the same and release the holding member, a coin chute for directing the coin to coin supporting guide, and a gate for closing the lower end of the chute, when said operating member is moved to actuate the vending member.

7. The combination of a movable member for vending articles, an operating member therefor, a coin supporting guide, having a coin supporting groove therein, said operating member having devices for engaging the coin on said guide, whereby the coin may be moved along said guide, a member carried by the movable vending member and extending into the path of the coin, whereby the movement of the coin will move said vending member, and means for holding said vending member from movement, said means having devices whereby the coin will engage the same and release the holding member, a coin chute for directing the coin to coin supporting guide, and a gate for closing the lower end of the chute, when said operating member is moved to actuate the vending member, and an auxiliary chute for directing the coins passing through the main chute to the front of the casing for the vending device, when said gate is closed.

8. The combination of a movable member for vending articles, an operating member therefor, a coin supporting guide, having a coin supporting groove therein, said operating member having devices for engaging the coin on said guide, whereby the coin may be moved along said guide, a member carried by the movable vending member and extending into the path of the coin, whereby the movement of the coin will move said vending member, and means for holding said vending member from movement, said means having devices whereby the coin will engage the same and release the holding member, a coin chute for directing the coins to the coin supporting guide, an auxiliary coin chute connected with the main coin chute at the receiving end thereof, means for sustaining the first coin in the auxiliary chute, whereby a second coin is required to release and operate the vending member.

9. The combination of a movable member for vending articles, an operating member therefor, a coin supporting guide, having a coin supporting groove therein, said operating member having devices for engaging the coin on said guide, whereby the coin may be moved along said guide, a member carried by the movable vending member and extending into the path of the coin, whereby the movement of the coin will move said vending member, and means for holding said vending member for movement, said means having devices whereby the coin will engage the same and release the holding member, a coin chute for directing the coins to the coin supporting guide, an auxiliary coin chute connected with the main coin chute at the receiving end thereof, means for sustaining the first coin in the auxiliary chute, whereby a second coin is required to release and operate the vending member, and means actuated by the movement of the operating member for releasing the coin in the auxiliary chute.

10. The combination of a rotating carrier, having means for supporting articles to be vended, of a coin controlled mechanism for releasing and operating the same, including an operating member, devices whereby a coin connects said operating member to said carrier, a lever for locking the carrier against movement, a member connected to the lever and operated by the coin for moving the lever to release the carrier, a spring for normally holding the lever in locking engagement with the carrier, and means for preventing the carrier from backward movement.

In testimony whereof, I have hereunto signed my name at Philadelphia, Pennsylvania, this thirtieth day of October 1912.

OTTO JAEGER.

Witnesses:
JAMES H. BELL,
E. L. FULLERTON.